Figure 1:
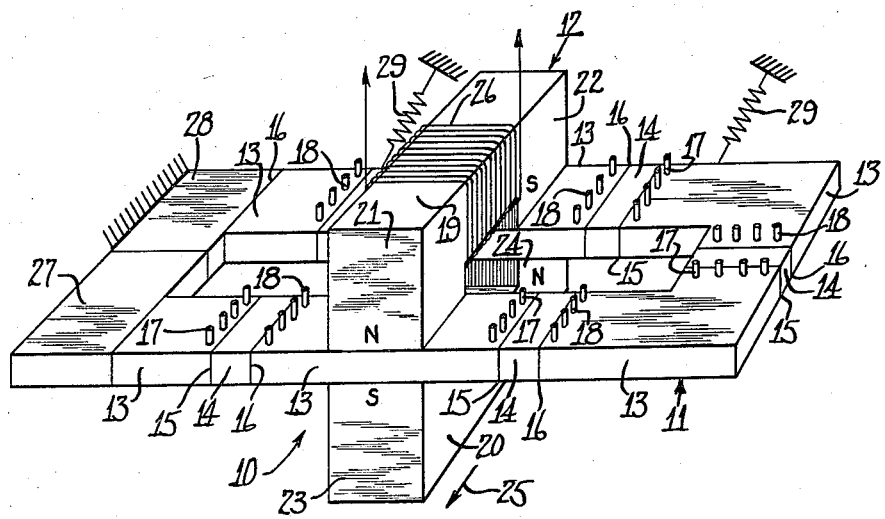

Dec. 29, 1959 W. J. FRY 2,919,356
THERMOELECTRIC TRANSDUCER
Filed Nov. 2, 1955 2 Sheets-Sheet 1

Inventor
William J. Fry

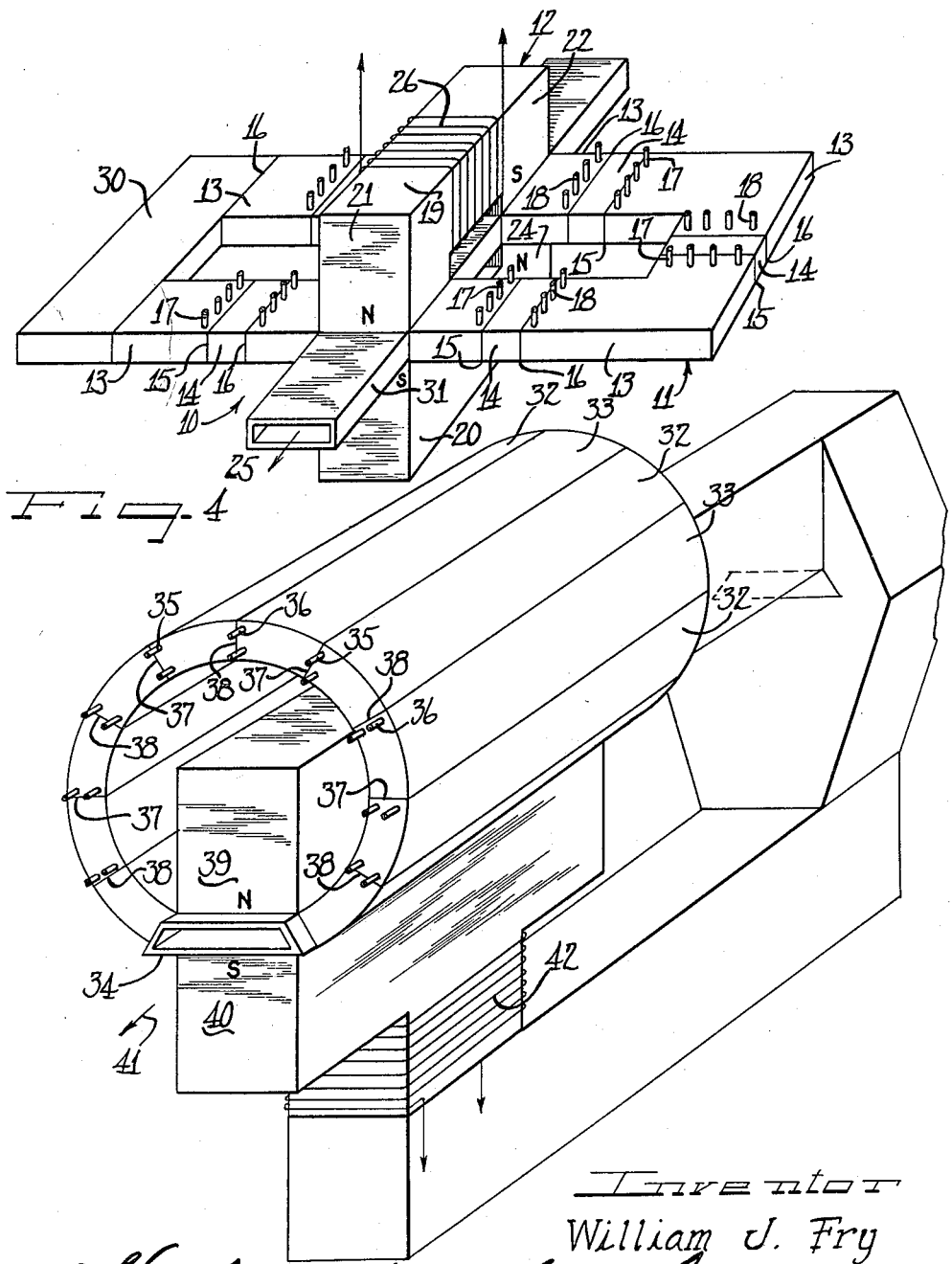

United States Patent Office 2,919,356
Patented Dec. 29, 1959

2,919,356

THERMOELECTRIC TRANSDUCER

William J. Fry, Urbana, Ill.

Application November 2, 1955, Serial No. 544,778

3 Claims. (Cl. 310—4)

The present invention relates to a thermal transducer and more particularly relates to a thermoelectric-magnetic transducer.

One of the saliently important features of the present invention lies in the ability of embodiments thereof to produce electric motor effects through the employment of thermoelectric and magnetic phenomena utilized in cooperation with each other. In accordance with the principles of this invention, these two phenomena may be so coordinated as to produce forces sufficient to move electrically conducting liquids or solids at extremely high velocities and/or create acoustic energy through vibrations effected through the described cooperation of these phenomena.

For example, thermoelectric effects may be so cooperatively utilized with magnetic effects that the thermal pile may be caused to vibrate and produce acoustic waves. Through a similar cooperation of these phenomena, electrically conductive fluid or solid materials may be forced to move at relatively high velocities, and even at such high velocities as those exceeding the velocity of escape from the earth's gravitational field.

Thus, in accordance with the principles of the present invention, a thermoelectric-magnetic motor may be provided to produce the described effects. In one form of the present invention, a thermoelectric generator can be realized where the output power appears in the form of mechanical or acoustic energy. In this form of the invention a series of alternate sections of two or more thermoelectric materials are joined together in closed circuit, thereby producing a short circuited thermal pile. Current is caused to circulate in the thermal pile as a result of the E.M.F (electromotive force) between the hot and cold junctions in accordance with well known thermoelectric principles. A magnetic field is superimposed on the system with the major component of the field having a direction at right angles to the direction of the current flow. If the field is a steady unidirectional field, then interruption of the current flow periodically will cause mechanical vibration of the thermal pile and thereby cause generation of an acoustic signal having a frequency corresponding to the mechanical vibration rate. Utilizing this same form of the invention but alternating the direction of the field will cause the same effects.

In another form of the invention, by maintaining all of the parts rigidly and maintaining the magnetic field constant, and providing a flow path through the magnetic field and through the thermal pile for a fluid or solid electrically conductive material in such a manner that the material will also carry at least a portion of the circulating current in the thermal pile, the fluid or solid will be acted upon in such a manner as to cause the same to flow or move in a direction at right angles to the magnetic field and at right angles to the direction of the current in accordance with the principles of electric motor operation.

It is, therefore, an important object and principle of the present invention to provide a new and improved thermoelectric-transducer operative to coordinate thermoelectric and magnetic phenomena to produce motion in accordance with electric motor principles.

Another object of the present invention is to provide a new and improved thermoelectric-magnetic transducer wherein a short circuited thermal pile is subjected to a magnetic field so that interruption of either the circulating current in the thermal pile or the magnetic field will produce mechanical motion which may be utilized to generate acoustic energy. Herein it should be noted that if a member is fastened to the vibrating element in this arrangement and is in contact with a medium such as water, acoustic energy will be radiated into the water and it is possible to design the attached member in order to efficiently extract the acoustic energy.

Yet another object of the present invention is to provide a new and improved thermal pile structure arranged in cooperation with means producing a magnetic field with the field oriented at right angles to the direction of current flow in the thermal pile so that interruption of the current flow or interruption or alternation of the magnetic field will produce vibrations and generate acoustic energy at frequencies corresponding to the interruption or alternation rate.

Still another object of the present invention is to provide a new and improved thermomagnetic transducer arranged with a short circuited thermal pile of new and improved construction characteristics.

Yet another object of the present invention is to provide a new and improved thermoelectric-magnetic transducer with a short circuited thermal pile arranged with the direction of current flow at right angles to the direction of the magnetic field whereby fluid or solid material which is electrically-conductive and disposed in a position to be acted upon by the magnetic field and to carry the thermal pile current will be forced to move and thereby move at relatively high velocities in a direction at right angles to the current flow and at right angles to the magnetic field.

Figure 2:
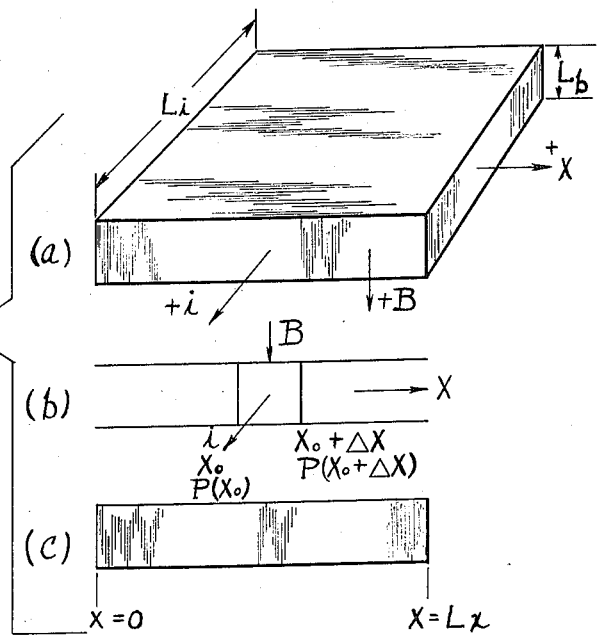

Still other objects, features and advantages of the present invention will become readily apparent to those skilled in the art and to others from the following detailed description of the present invention and embodiments thereof, from the claims, and from the accompanying drawings in which each and every detail shown is fully and completely disclosed as a part of this specification, in which like reference numerals refer to like parts, and in which:

Figure 1 is a more or less diagrammatic illustration of an acoustic wave generator and vibrator embodying the principles of the present invention;

Figure 2, including parts a, b and c, is a schematic illustration of isolated regions carrying dimensions for the purposes of better illustrating those parts and dimensioning the same as a visual aid to understanding the hereinbelow developed mathematical laws governing the operation of devices embodying the principles of this invention;

Figure 3 is a more or less diagrammatic illustration of another form of the present invention adapted for causing electrically conductive fluids or solids to move through the system; and Figure 4 is a more or less diagrammatic illustration of still another form of the present invention.

As shown on the drawings:

In the embodiment of the present invention illustrated in Figure 1, there is shown a thermal transducer 10 in which there is a thermopile or thermal pile 11 operatively associated with a magnetic field producing means 12. The thermal pile takes the form of a complete loop and is composed of alternate conductive segments of dissimilar thermoelectric materials 13—13—13 and 14—14—14. These segments are formed of relatively large bars and the materials from which they are composed may consist, for example, of such commonly used pairs of materials as copper and constantan or iron and constantan or the like so as to form thermocouple junctions of copper-constantan or iron-constantan, or the like. These materials may include semiconductors such as semiconducting silicon, etc.

According to well known thermoelectric principles, if these junctions are alternately hot and cold, respectively, then series electric potential differences will be produced in aid of each other. Therefore, in this structure first, third and fifth junctions, etc. 15—15—15 are heated to form hot junctions, while second, fourth and sixth junctions, etc. 16—16—16 are cooled to provide cold junctions between the dissimilar thermoelectric materials.

Heating and cooling of the junctions 15 and 16 is effected according to this invention, for example, by embedding heat transfer tubes in the bars of the thermal pile so that hot tubes 17—17—17 are adjacent to the hot junctions 15, while cold tubes 18—18—18 are adjacent to the cold junctions 16. By then passing a heating medium through the hot tubes 17 and a cooling medium through the cold tubes 18, the hot junctions 15 will be heated and the cold junctions 16 will be cooled so that the series thermal pile will develop series aiding electric potential differences and when the output of the thermal pile is short circuited, as hereinafter described, a relatively high circulating current will flow through the bars or segments. The conductive loop may thereby be termed as being self-excited.

When this thermal pile, with a high circulating current therein in a direction of, for example, clockwise, as viewed in Figure 1, is placed in a magnetic field properly oriented and, for example, substantially perpendicular to the general plane of the loop thermal pile, mechanical motion or forces tending to create the same are generated in accordance with basic electric motor principles. To this end, the thermal pile 11 is associated with a magnet indicated generally at 12 and comprised of a pair of sections 19 and 20 having poles which direct the field toward a relatively movable portion of the complete loop. These magnet sections 19 and 20 may take a form somewhat similar to that of horseshoe magnets and while they may be permanent magnets or electromagnets, they are so disposed that they are oppositely oriented. That is, the magnets 19 and 20 are so oriented that if the pole 21 of the magnet 19 is a north pole then the pole 23 of the magnet 20 will be a south pole from which it follows that the pole 22 of the magnet 19 will be a south pole and the pole 24 of the magnet 20 will be a north pole. Assuming that these magnet members 19 are magnetized, whether it be by permanent magnetization or electromagnetization, then if the polarities are as described and the current flow aforementioned is circulating in the thermal pile 11, then in accordance with basic electric motor principles forces are created tending to move the thermal pile in a direction as indicated by the arrow 25. If the current circulating in the thermal pile is intermittently broken, or if the magnets are energized through an alternating current potential difference applied to the winding 26, then the thermal pile 11 may be caused to vibrate and the rate of interruption of the current or the rate of alternation of the magnet energizing current will determine the vibration rate.

Mechanical vibration or oscillation of the thermal pile may be so accomplished in accordance with the principles of this invention as to cause the same to produce acoustic waves of frequencies corresponding to the current interruption rate or the magnetization current alternation rate. The face of the vibrating thermal pile may be coupled to a medium such as water or the like whereby the acoustic energy will be radiated at the described frequencies. A member may be fastened to the face of the vibrating element to aid in the efficient extraction of acoustic energy.

While it is clear that numerous mechanisms are available for interruption of the thermal pile circulating current, one thereof has been illustrated here by way of example. In Figure 1 there is shown a broken conductive shorting bar having two parts 27 and 28 with the part 27 fixed to an end of a thermal pile segment 13 and the shorting bar part 28 being fixedly secured in a relatively stationary position but in electrical engagement with the other end thermal pile segment 13. A pair of resilient tension members or springs 29—29 are fixed to the side of the thermal pile so that any motion of the thermal pile in the direction of the arrow 25 will stress the springs 29. During operation of the device, as by heating the hot junctions and cooling the cold junctions and causing the magnetic field to exist between the poles of the magnets 19 and 20, the thermal pile will be caused to vibrate mechanically since it will be forced in the direction of the arrow 25 thereby disengaging the shorting bar parts 27 and 28 and thus opening the thermal pile circuits. Thereupon the electrical force will be released and the members 29, acting in an opposite direction, will cause the parts of the shorting bar to reengage and thereby reclose the circulating current path whereupon the cycle will begin again. The relative motion produced may be termed as being substantially straight-line or substantially linear as distinguished from rotational motion as found in rotating devices.

For a thorough understanding of the operation of the device of Figure 1, attention is directed to Figure 2 and particularly parts $a$, $b$ and $c$ thereof, wherein schematic segmental illustrations are provided with dimensions and coordinates provided thereon in terms to be explained hereinbelow in conjunction with the development of the theoretical laws followed by a device embodying this invention.

In these figures and in the following formulas the symbols $L_1$, $L_B$, $L_x$ represent the dimensions of the conducting medium, B represents the magnetic induction density, $\rho$ is the density of the medium, V is the velocity of sound in the medium, P and $p$ represent pressure, $v$ is the particle velocity, $\sigma$ is the current density, and $\xi$ is the particle displacement, and $i$ represents the current.

Now if we consider a medium embedded in a magnetic field and carrying a current as illustrated in Figures 2a, b and c, derivation of the equations of motion for the medium is as follows:

Consider an element of the medium between two planes $X=X_0$ and $X=X_0+\Delta X$. Then (1)
$$-P(x_0+\Delta x)L_B L_i + P(x_0)L_B L_i + BL_i(\sigma L_B \Delta x) = \rho L_B L_i \Delta x \frac{\partial^2 \xi}{\partial t^2}$$

or (2)
$$-\frac{\partial P}{\partial x} + B\sigma = \rho \frac{\partial^2 \xi}{\partial t^2}$$

Let $P=P_0+p$ and observing that for a plane sound wave (3)
$$p = -\rho V^2 \frac{\partial \xi}{\partial x}$$

it follows that (4)
$$\frac{\partial^2 \xi}{\partial x^2} + \frac{B\sigma}{\rho V^2} = \frac{1}{V^2}\frac{\partial^2 \xi}{\partial t^2}$$

When $B\sigma=0$ Equation 4 reduces to the usual sound wave equation. Now introducing the particle velocity $$v = \frac{\partial \xi}{\partial t}$$

and in addition let (5)
$$v = v_a e^{j\omega t}$$
$$B\sigma = (B\sigma)_a e^{j\omega t} \quad p = p_a e^{j\omega t}$$

Then from Equation 4 it follows that (6)
$$\frac{d^2 v_a}{dx^2} + \frac{j\omega (B\sigma)_a}{\rho V^2} = -\left(\frac{\omega}{V}\right)^2 v_a$$

Now a particle distribution function for $(B\sigma)_a$ is chosen. A general distribution function can readily be constructed from a linear combination of such particular functions. Letting (7) $\quad (B\sigma)_a = B_0 \sigma_0 \cos \alpha x$ and substituting Equation 7 into Equation 6 it follows that (8)
$$\frac{d^2 v_a}{dx^2} + \left(\frac{\omega}{V}\right)^2 v_a = -\frac{j\omega B_0 \sigma_0}{\rho V^2} \cos \alpha x$$

Solving Equation 8 it is determined that (9)
$$v_a = A \cos \frac{\omega x}{V} + B \sin \frac{\omega x}{V} + \frac{j\omega B_0 \sigma_0}{\rho V^2} \frac{1}{\alpha^2 - \left(\frac{\omega}{V}\right)^2} \cos \alpha x$$

At $X=0$ the conducting medium is terminated in an acoustic impedance $Z_1$ that is,

(10)
$$\left.\frac{p_a}{v_a}\right|_{x=0} = -Z_1$$

At $X=L_x$ the conducting medium is terminated in an acoustic impedance equal to zero, that is,

(11)
$$\left.\frac{p_a}{v_a}\right|_{L_x} = 0$$

Now observing that

(12)
$$p_a = -\frac{\rho V^2}{j\omega} \frac{\partial v_a}{\partial x}$$

which follows from Equation 3, the following expression is obtained for the constant A

(13)
$$A = \frac{\omega}{\rho V^2} \frac{B_0 \sigma_0}{\alpha^2 - \left(\frac{\omega}{V}\right)^2} \cdot \frac{\left(\frac{Z_1}{\rho V}\right) \cos \frac{\omega L_x}{V} - j\left(\frac{\alpha}{\left(\frac{\omega}{V}\right)}\right) \sin \alpha L_x}{\sin \frac{\omega L_x}{V} + j\left(\frac{Z_1}{\rho V}\right) \cos \omega L_x}$$

In order to obtain an expression for the radiated acoustic power, the evaluation is made first for $$v_a|_{x=0}$$

by letting $$v_a|_{x=0} = v_{ao}$$

and also let $Z_1 = \rho_0 V_0$. Then

(14)
$$v_{ao} = \frac{j\omega B_0 \sigma_0}{\rho V^2} \frac{1}{\alpha^2 - \left(\frac{\omega}{V}\right)^2} \cdot \frac{\sin \frac{\omega L_x}{V} - \left(\frac{\alpha}{\omega/V}\right) \sin \alpha L_x}{\sin \frac{\omega L_x}{V} + j \frac{\rho_0 V_0}{\rho V} \cos \frac{\omega L_x}{V}}$$

In order to illustrate the theory, consider the specific case $\alpha = 0$, i.e., $B\sigma$ is independent of the coordinate X. Then

(15)
$$v_{ao} = \frac{-j B_0 \sigma_0}{\rho V \left(\frac{\omega}{V}\right)} \cdot \frac{\sin\left(\frac{\omega L_x}{V}\right)}{\sin\left(\frac{\omega L_x}{V}\right) + j\left(\frac{\rho_0 V_0}{\rho V}\right) \cos \frac{\omega L_x}{V}}$$

Now the power, I, radiated per unit area (perpendicular to $x$) is

(16) $\quad I = \tfrac{1}{2} \rho_0 V_0 |v_{ao}|^2$

If the frequency is restricted to sufficiently small values then (15) yields for $|v_{ao}|$

(17)
$$|v_{ao}| = \frac{B_0 \sigma_0 L_x}{\rho_0 V_0}$$

The conditions on the frequency are

(18)
$$\frac{\omega L_x}{V} \leq 0.1 \text{ or } 0.2$$

$$\frac{\omega L_x}{V} < \left(\frac{1}{3}\right) \frac{\rho_0 V_0}{\rho V}$$

Then

(19)
$$I = \frac{1}{2} \frac{[B\sigma_0 L_x]^2}{\rho_0 V_0}$$

Units

I—ergs./cm.²/sec.
B—gauss
$L_x$—cm.
$\rho_0$—gr./cm.³
V—cm./sec.
$\sigma_0$—abamp./cm.²

Thus there is developed a determination of the acoustic energy radiated by a generator such as that described in connection with Figure 1.

Another form of the invention and one utilizing the same principles but maintaining the closed loop thermal pile in a fixed relation with the magnet for the generation of forces to be used in a slightly different manner is illustrated in Figure 3 wherein the shorting bar 30 is fixed to the end thermal pile segments 13 to close the circuit for high circulating current levels. An additional modification from the structural arrangement shown in Figure 1 is effected by passing a conduit 31 between the poles of the magnets 19 and 20 and through the thermal pile loop 11 in such a manner that electrically conductive fluid or solid material flowing or moving through the tube or conduit 31 will conduct the current of the thermal pile. In such an arrangement the electric motor principles will be applicable and forces will be applied to the fluid or solid material flowing or moving through the tube or conduit 31 to force the same to flow or move in the direction of the arrow 25.

Another form of the invention utilizing these same principles is illustrated in Figure 4 wherein a cylindrical type thermal pile is illustrated having alternate segments of dissimilar thermoelectric materials 32—32 and 33—33, respectively. The segments extend for the full length of the cylindrical thermal pile and are formed as radial segments. One or more radial segments of the cylinder consist of fluid conducting flow-conduits or provision for the movement of solids 34. Alternate junctions between the thermal pile segments are heated and cooled, respectively, as by heating fluid and cooling fluid respectively flowing through heating tube 35—35 and cooling tubes 36—36. There is thereby formed a series of hot and cold junctions 37 and 38, respectively. Magnetic means such as poled magnets 39 and 40 are disposed on opposite radial sides of the fluid-conducting or solid-guiding tube 34 so that the magnetic fields will pass through the electrically conductive material flowing or moving through the tube 34 in substantially the same manner as that described in conjunction with Figure 3.

Thus, with the magnetic field passing through the medium in, for example, a direction as with the pole 39 being north and the pole 40 being south, with the current passing through the medium in a clockwise direction, the medium will be forced to flow or move in a direction of the arrow 41 under electric motor principles.

With systems embodying the principles of this invention such as the systems of Figures 3 and 4, extremely high fluid or solid body velocities are, at least theoretically, obtainable. The theoretically possible velocities can be readily calculated by reference again to Figure 2 and the foregoing discussion of the parameters there set out. In the present instance, however, we will consider that the conducting material is in a direct current magnetic field, such as may be provided by permanent magnets or by direct current energization of the magnetization coils 26 of Figure 3, or 42 of Figure 4, and that the field is at right angles to the direction of the current being conducted in the medium. Then, the conducting medium will be accelerated in the direction of the axis and it may be determined that $$(20) \quad \frac{\rho d^2 \xi}{dt^2} = B\sigma$$

$\xi$=displacement of a plane of the material, perpendicular to $x$, from rest.
From this it follows that $$(21) \quad \frac{d\xi}{dt} = \frac{B\sigma}{\rho} t + C$$

Letting $$\frac{d\xi}{dt} = 0$$

at $t=0$ then $C=0$ and $$(22) \quad \frac{d\xi}{dt} = \frac{B\sigma}{\rho} t$$

By integrating Equation 22 it follows that $$(23) \quad \xi = \frac{B\sigma t^2}{2\rho} + D$$

From which it follows that if $\xi=0$ when $t=0$, then $D=0$. An expression relating the velocity to the displacement is obtainable from Equations 22 and 23. This gives $$(24) \quad \left(\frac{d\xi}{dt}\right)^2 = \frac{2\xi B\sigma}{\rho}$$

Let the velocity be designated as $v_e$ when the displacement is equal to L, then, $$(25) \quad v_e = \sqrt{\frac{2LB\sigma}{\rho}}$$

The time, $t_e$, required to reach this velocity is $$(26) \quad t_e = \sqrt{\frac{2\rho L}{B\sigma}}$$

As a calculable example, if $B=10,000$ gauss and $\rho=1$ gm./cm.$^3$ and $\sigma$ is $(10)^6$ amps./cm.$^2$ and L is 1000 cm. then it is determined from Equations 20 and 21 that $v_e=1.4\times10^6$ cm./sec. or 32,000 miles per hour, while $t_e=1.4\times10^{-3}$ seconds or 0.0014 second.

From the foregoing it will be readily observed that numerous modifications and variations may be effected within the principles of the present invention.

I, therefore, intend to cover all such modifications and variations as fall within the true spirit and scope of the novel concepts and principles of this invention.

I claim as my invention:
1. A transducer comprising in combination: a series of thermoelectric material segments of one type and a series of thermoelectric material segments of another type, said types of segments being alternately arranged and interconnected with each other to define a structural loop having a plurality of hot junctions and a plurality of cold junctions; a plurality of fluid conduits each disposed in only one of said segments adjacent to but spaced from one of said junctions, and disposed in only generally parallel relation thereto, for conducting a heat-exchange fluid to said one junction, to define a self-excited thermopile circuit; said circuit having a first conducting portion thereof relatively movable with respect to a second conduction portion thereof; and magnet means operatively independent of said loop and having poles disposed intermediate one of said hot junctions and one of said cold junctions in said loop for providing a magnetic field directed toward and for acting on said first portion and being relatively movable with respect thereto, said first portion of said thermopile circuit being arranged to react with said field in a substantially straight-line motion.

2. A thermoelectric transducer comprising a thermal pile; means intermittently short-circuiting the output of said thermal pile; magnetic field-producing means having poles directed toward a movable portion of said thermal pile whereby said movable portion reacts with the field to cause relative motion; and resilient means urging said movable portion in a direction opposite to that produced by the reaction of said movable portion with said field; whereby said movable portion of the thermal pile is caused to vibrate at a frequency corresponding to the rate of operation of the means intermittently short-circuiting the output of said thermal pile.

3. A thermoelectric transducer comprising a thermal pile; means short-circuiting the output of said thermal pile; alternating magnetic field-producing means having poles directed toward a movable portion of said thermal pile whereby said movable portion reacts with the field to cause relative motion; and resilient means urging said movable portion in a direction opposite to that produced by the reaction of said movable portion with said field, whereby said movable portion of the thermal pile is caused to vibrate at a frequency corresponding to the alternations of the magnetic field producing means.

References Cited in the file of this patent

UNITED STATES PATENTS

| | | |
|---|---|---|
| 1,199,444 | Varley | Sept. 26, 1916 |
| 2,031,976 | Mathias | Feb. 25, 1936 |
| 2,386,369 | Thompson | Oct. 9, 1945 |
| 2,425,647 | Sarver | Aug. 12, 1947 |
| 2,443,641 | Ray | June 22, 1948 |
| 2,686,474 | Pulley | Aug. 17, 1954 |
| 2,748,710 | Vandenberg | June 5, 1956 |
| 2,756,678 | Collins | July 31, 1956 |
| 2,787,219 | Werner | Apr. 2, 1957 |

FOREIGN PATENTS

| | | |
|---|---|---|
| 109,570 | Germany | Mar. 24, 1900 |
| 199,907 | Germany | July 4, 1908 |